United States Patent [19]

Reed et al.

[11] 3,962,610

[45] June 8, 1976

[54] MANUAL BY-PASS DEVICE FOR METER SOCKETS

[75] Inventors: Ronald H. Reed, Versailles; Raymond A. Diersing, Lexington, both of Ky.

[73] Assignee: Square D Company, Park Ridge, Ill.

[22] Filed: Aug. 21, 1974

[21] Appl. No.: 499,366

[52] U.S. Cl.............................. 317/108; 317/107; 200/51 R; 339/95 R; 324/149
[51] Int. Cl.² ......................................... H02B 9/00
[58] Field of Search.................. 324/110, 149, 156; 317/104, 105, 107, 108; 339/95 R, 111; 200/243, 252, 260, 51 R, 51.09, 51.1, 16 A

[56] References Cited
UNITED STATES PATENTS

| 2,838,626 | 6/1958 | Kuhn | 317/107 |
| 2,838,627 | 6/1958 | Kuhn et al. | 317/107 |
| 3,369,088 | 2/1968 | Knecht | 317/108 |

*Primary Examiner*—Gerald P. Tolin
*Attorney, Agent, or Firm*—Harold J. Rathbun; Harry G. Thibault

[57] ABSTRACT

A socket for a watt-hour meter is provided with a manual by-pass device to prevent interruption of power to a load when the watt-hour meter is removed from the socket. The manually operable by-pass device comprises a slider having a pair of contact bridges mounted on a body portion of the slider. The slider is mounted on an insulating base of the by-pass device for reciprocable movement. The bar is supported by contact brackets which are connected to line and load terminals of the meter socket, the slider being reciprocably movable to provide selective engagement between the contact brackets and the contact bridges when the watt-hour meter is removed from the socket.

6 Claims, 3 Drawing Figures

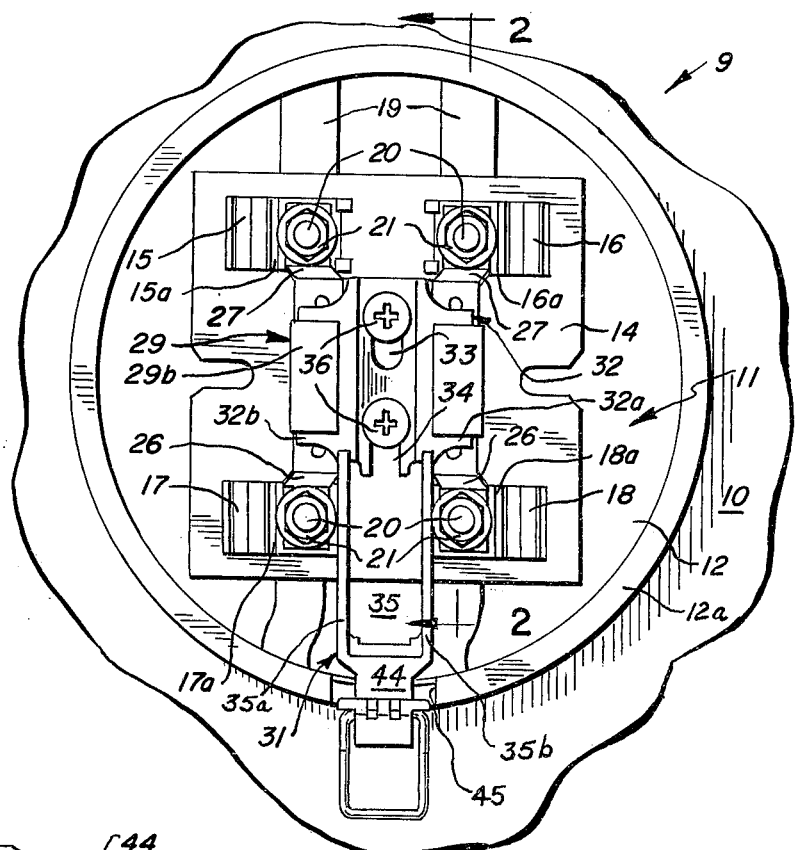
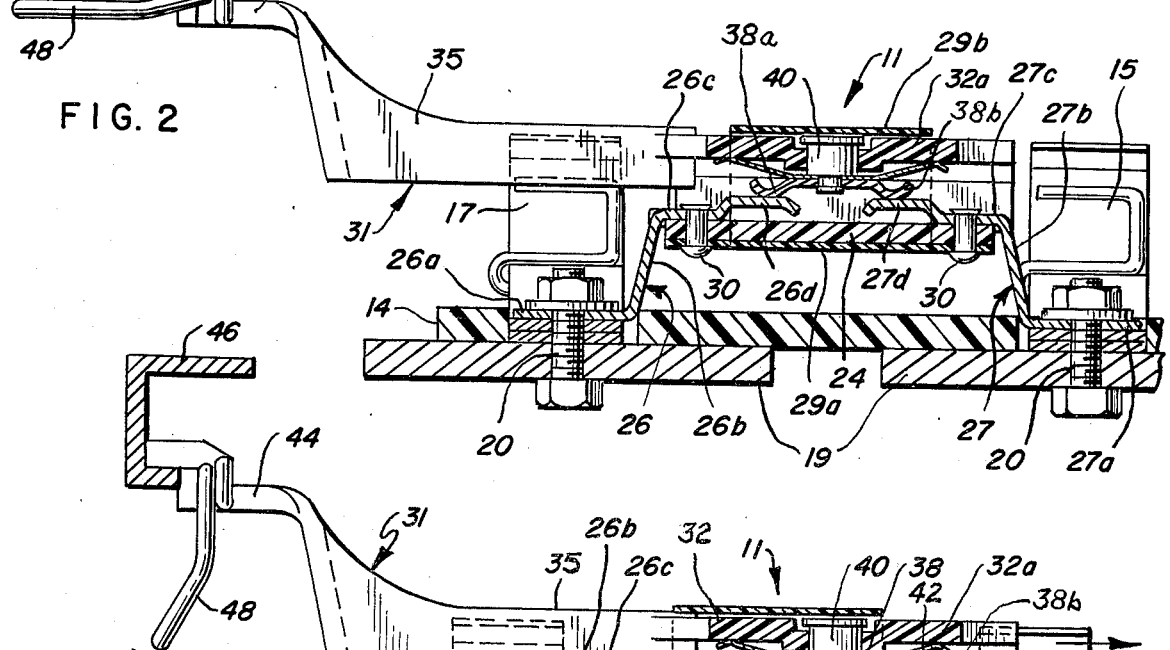
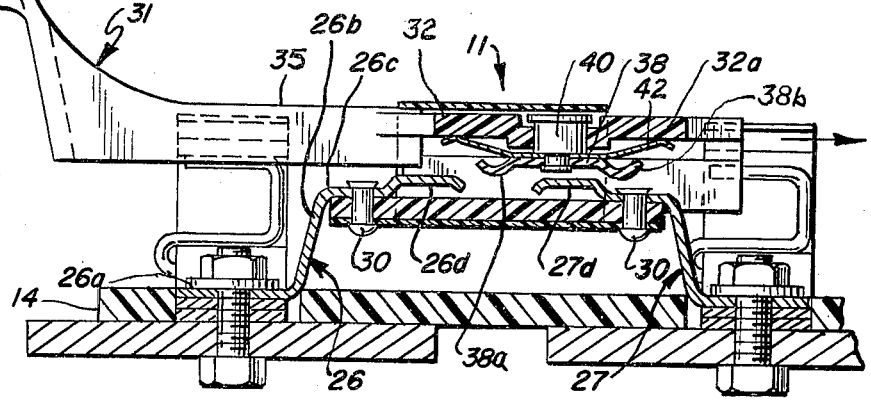
FIG. 1
FIG. 2
FIG. 3

MANUAL BY-PASS DEVICE FOR METER SOCKETS

This invention relates to a by-pass device for a watt-hour meter socket and, more particularly, to a manually operable by-pass device for preventing interruption of power when the meter is removed from the socket.

In order to test and re-calibrate a watt-hour meter, it is necessary to remove the meter from its socket. Because the current flowing to the load being metered must flow through the meter, removal of the meter from its socket interrupts the load current unless means are provided to complete an alternate path for it. Because of the nature of present day loads, even a momentary interruption of power is apt to be of material disadvantage. For example, most loads include one or more electric clocks so that an interruption or even a few minutes duration is noticeable and troublesome.

Prior manual by-pass devices for watt-hour meters have comprised units integrated with the meter socket assembly. For example, in U.S. Pat. No. 3,262,130, issued July 26, 1966, one pair of contacts of the by-pass device continuously engage the load terminals of the meter socket and a second pair of contacts are selectively engaged with the line terminals of the meter socket by a crank mechanism to effect continual current flow through the socket. It would be desirable if the by-pass device were self-contained and easily removable from the meter socket. Further, it would be desirable if the by-pass device included means to prevent inadvertent operation of the device when the meter is in place.

A watt-hour meter socket with which the by-pass device of this invention may be used comprises an enclosure containing a pair of load plug-in terminals and a pair of line plug-in terminals for receiving respective contact blades of a watt-hour meter of the plug-in type. The watt-hour meter, when plugged in, bridges the line and load terminals to supply current to a load through the meter.

In accordance with this invention, the meter socket is provided with an improved manually operable by-pass device for electrically interconnecting the line and load terminals so that the meter may be removed from the socket without interrupting electrical power flowing to a load being supplied through the meter. The by-pass device comprises a slider having a pair of contact bridges having a contact at each end thereof and mounted on a body portion of the slider. When the meter is removed from the socket, the slider is reciprocally moved so that each contact bridge engages a pair of stationary contacts electrically connected respectively to line terminals and load terminals of the socket. To replace the meter in the socket, the slider must be returned to its original position which disengages the contact bridges from the stationary contacts. The stationary contacts include respective end portions of contact brackets which support an insulating base of the by-pass device. The by-pass device is self-contained and readily mountable on, and removable from, the terminals of the meter socket.

When the watt-hour meter is in place, a meter mounting ring holds the watt-hour meter on the meter socket by simultaneous engagement with a flange of the watt-hour meter and an outer ring of the meter socket. The meter mounting ring also engages the sliding member of the by-pass device to prevent reciprocal movement of the slider.

It is an object of this invention to provide an improved manually operable by-pass device for a watt-hour meter socket to prevent interruption of power flow to the load upon removal of the meter from the socket, the device being self-contained and easily installable on and removable from the socket.

A further object is to provide a by-pass device including improved means to prevent inadvertent operation of the device when the meter is in place.

Other objects and advantages of this invention will become apparent from the following specification wherein reference is made to the drawings in which:

FIG. 1 is a front elevational view of a socket for a watt-hour meter which includes a by-pass device constructed in accordance with this invention;

FIG. 2 is a sectional view of the by-pass device in the closed position taken generally along the line 2—2 of FIG. 1; and FIG. 3 is a view somewhat similar to FIG. 2 except that the by-pass device is in the open position, as it would be with a watt-hour meter installed in the socket.

Referring to the drawings, a manual by-pass device 11 is shown mounted in a watt-hour meter socket 9 having a front wall or cover portion 10 provided with a circular meter-receiving opening 12 having a peripheral flange 12a.

The socket 9 includes an insulating base 14 which supports a pair of plug-in line terminals 15, 16 and a pair of plug-in load terminals 17, 18 of the spring-jaw type. The terminals 15, 16, 17 and 18 have respective inwardly extending base portions 15a, 16a, 17a, and 18a having respective apertures aligned with respective openings in the base 14. Screws 20 are appropriately secured to bus bars 19 and pass respectively through the apertures in the base 14 and the aligned openings in the base portions 15a, 16a, 17a, and 18a. Nuts 21 may be threaded onto the screws 20 to complete the assembly and to secure the terminals 15, 16, 17, and 18 to the bus bars 19 and to the base 14 with or without the by-pass device of this invention.

The manual by-pass device 11 comprises a rectangular base portion 24 of insulating material supported by two pairs of Z-shaped contact brackets or members 26, 27.

Each contact bracket 26 comprises a base portion 16a, a support leg or spacing portion 26b and an upper supporting and contact portion 26c and each Z-shaped contact bracket 27 has corresponding portions 27a, 27b, and 27c. The upper portions 26c and 27c have stepped contact portions 26d and 27d at the free end portions thereof.

The inner or fixed end portions of upper portions 26c and 27c abut an upper surface of the base 24. Rivets 30 secure the base 24 to the bracket pairs 26, 27 at the fixed end portions of supporting and contact portions 26c and 27 c. The rivets 30 also secure a lower flange 29a of a generally C-shaped insulating shield 29 to the underside of the base 24. The contact portions 26d and 27d extend toward each other across the upper surface of the base 24 as shown in FIGS. 2 and 3. Respective support leg portions 26b and 27b extend downwardly adjacent opposite side walls of the base 24. Base portions 26a and 27a have openings therein for mounting the device 11 on the screws 20 of the socket 9.

A slider 31 has a channel-shaped body portion 32, the bight portion of the body portion 32 having elongated slots 33 and 34 which receive screws 36 that are threaded into underlying holes (not shown) in the base 24 to secure the slider 31 to the base 24. The bight portion of the body portion 32 abuts the base 24, the screws 36 retain the slider 31 on the base 24, and slots 33 and 34 permit reciprocable movement of the slider 31. The slider body 32 has flange portions 32a and 32b as shown in FIG. 1 extending outwardly from respective outer or free ends of leg portions of the slider body 32 to accommodate contact ridges 38 secured respectively thereto by shoulder rivets 40. Each bridge 38 has arms or bridging contacts 38a and 38b which extend outwardly from a central portion of the bridge 38. Springs 42 also held by the rivets 40 resiliently engage the respective contact bridges 38 and maintains the spacing between the contact bridges 38 and the respective flanges 32a or 32b. Upper flanges 29b of the insulating shield 29 extend above the respective flanges 32a and 32b so that the shield 29 partially encloses the contact bridges 38 and to confine and direct arcs generated therefrom.

A bifurcated handle portion 35 of the slider 31 has arms 35a and 35b which extend outwardly from the leg portions of the body portion 32 and terminates in an end closure 44 which is received in an opening 45 in the flange 12a. A meter mounting ring 46 (FIG. 3) mounted on the flange 12a also engages the end closure 44. A pivoted pull ring 48 mounted on the end closure 44 of the handle portion 35 can be raised from the position shown in FIG. 3 to the position shown in FIG. 2 to facilitate reciprocable movement of the slider.

The by-pass device 11 may be secured to its respective pairs of line terminals 15, 16 and load terminals 17, 18 of the meter socket 9 by the nuts 21 on the screws 20, the screws 20 passing through the openings in the base portions 26a and 27a of the contact brackets 26 and 27. The base portions 26a, 27a of one bracket pair 26, 27 are electrically connected to terminals 18 and 16, respectively, and base portions 26a, 27a of the other bracket pair 26, 27 are electrically connected to terminals 17 and 15 respectively.

The operation of the by-pass assembly 11 is as follows:

With the meter in place, the meter mounting ring 46 is mounted on the flange 12a and engages the end closure 44 of the handle 35 which rests in the opening 45 in the flange 12a to retain the by-pass assembly 11 in the position shown in FIG. 3. The contact bridges 38 and their associated bridging contacts 38a and 38b do not engage the contact portions 26d and 27d of the contact brackets 26 and 27. To remove the meter (not shown) from the socket 9, the meter mounting ring 46 is disengaged. The slider 31 can then be selectively moved to the position shown in FIGS. 1 and 2 wherein the bridging contacts 38a engage the contact portions 26d and the bridging contacts 38b engage the contact portions 27d, completing a current path between terminals 18 and 16 and terminals 17 and 15 through their respective contact bracket pairs 26, 27 and the contact bridges 38 mounted on the respective flanges 32a and 32b.

With the contacts 38a and 38b in engagement with the contact portions 26d, 27d of the brackets 26 and 27, current will flow thru the by-pass device and the meter may be removed. Further, the end closure 44 of the handle 35 extends beyond the periphery of the flange 12a when the bridging contacts 38a and 38b engage the stationary contact brackets 26, 27. Therefore, the meter mounting ring 46 cannot be mounted on the cover 10 until the meter is installed and the bridging contacts of the by-pass device 11 are disengaged from contact portions 26d, 27d of the contact brackets 26, 27 as shown in FIG. 3. Further, with the meter in the socket, the meter mounting ring 46 engages the end closure 44 to prevent reciprocable movement of the handle and inadvertent operation of the by-pass device.

We claim:

1. The combination with a meter socket for a watt-hour meter having four contact blades extending outwardly therefrom, the meter socket including a front wall having an opening therein for accommodating a meter, a meter mounting ring mountable on the front wall about the opening for restraining the meter in place in the socket, four spring-jaw terminals mounted in the socket in alignment with the opening in the front wall for receiving the contact blades of the meter, respectively, two of the spring-jaw terminals being load terminals for connection to a load, and two of the spring-jaw terminals being line terminals for connection to power supply lines, of a manual by-pass device operable to provide continuous electrical service through the socket when the meter is removed from the socket and the contact blades are removed from the spring-jaw terminals, the by-pass device comprising four stationary contact brackets each having a base portion and a contact portion at opposite ends of an intermediate spacing portion, the base portions of the brackets being electrically connected to the spring-jaw terminals, respectively, the contact portions of the brackets being co-planar and spaced toward the front wall of the socket from the base portions by the respective spacing portions, two of the brackets connected to the spring-jaw terminals which are line terminals and the contact portions thereof being in side-by-side relation and the contact portions of the brackets connected to the spring-jaw terminals which are load terminals and the contact portions thereof being in side-by-side relation, an insulating base supported by the contact portions and positioned inwardly of the front wall therefrom, a slider reciprocally mounted on the insulating base and having two contact bridges mounted thereon, each contact bridge being aligned with two of the contact portions which are in side-by-side relation with the other two contact portions so as to be engageable therewith and disengageable therefrom upon reciprocation of the slider, biasing means between the slider and the contact bridges biasing the contact bridges inwardly of the front wall toward the contact portions, a handle portion of the slider extending outwardly to engage the meter mounting ring when the ring is mounted on the front wall and positioning the contact bridges in disengaged position with respect to the contact portions, the slider being capable of reciprocable movement only when the meter mounting ring is disengaged from the front cover to cause engagement of the contact bridges with the contact portions thereby to provide an alternate current path between the line and load terminals.

2. A combination of a meter socket and a watt-hour meter as claimed in claim 1 wherein the contact portions have respective free end portions which are spaced toward the front wall from the insulating base.

3. A combination of a meter socket and a watt-hour meter as claimed in claim 1 wherein the slider has a channel-shaped body having its bight portion abutting a surface of the insulating base facing the front wall, leg portions extending from the bight portion toward the front wall, and flanges extending outwardly from the respective free ends of the leg portions, and the contact bridges are mounted on the flanges, respectively.

4. A combination of a meter socket and watt-hour meter as claimed in claim 1 wherein there is an outwardly turned flange about the front opening, the handle portion of the slider is received in an opening in the flange to permit said engagement of the handle portion with the meter mounting ring.

5. A combination of a meter socket and a watt-hour meter as claimed in claim 4 wherein the slider has a ring-shaped handle extending outwardly of the flange.

6. A meter socket and watt-hour meter combination as claimed in claim 1 wherein a C-shaped arc confining insulating shield has side walls positioned on opposite sides of the slider and contact portions, a base portion secured to the insulating base, and flange portions disposed between the slider and the front wall.

* * * * *